(12) United States Patent
Pawlikowski

(10) Patent No.: US 8,136,562 B2
(45) Date of Patent: Mar. 20, 2012

(54) TIRE BEAD INSULATION

(75) Inventor: John F. Pawlikowski, Ravenna, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 1123 days.

(21) Appl. No.: 11/962,197

(22) Filed: Dec. 21, 2007

(65) Prior Publication Data

US 2008/0163971 A1   Jul. 10, 2008

Related U.S. Application Data

(60) Provisional application No. 60/877,831, filed on Dec. 29, 2006.

(51) Int. Cl.
*B60C 5/00* (2006.01)
(52) U.S. Cl. .................. 152/450; 152/541; 152/539
(58) Field of Classification Search .................. 152/539, 152/541, 450
See application file for complete search history.

(56) References Cited

U.S. PATENT DOCUMENTS

| | | |
|---|---|---|
| 3,502,526 A | 3/1970 | Woodall |
| 3,844,326 A | 10/1974 | Verdier |
| 3,964,533 A | 6/1976 | Arimura et al. |
| 4,087,298 A | 5/1978 | Mangun et al. |
| 4,202,391 A | 5/1980 | Shibayama et al. |
| 4,561,919 A | 12/1985 | Forsyth |
| 4,611,647 A | 9/1986 | Rimondi |
| 4,649,976 A | 3/1987 | Cherveny et al. |
| 4,791,971 A | 12/1988 | Shinn |
| 4,881,586 A | 11/1989 | Shinomiya |
| 5,046,541 A | 9/1991 | Bonko |
| 5,056,573 A | 10/1991 | O'Brien et al. |
| 5,188,683 A | 2/1993 | Bonko |
| 5,194,485 A | 3/1993 | Kikuchi et al. |
| 5,259,429 A | 11/1993 | Harms |
| 5,280,064 A | 1/1994 | Hesp et al. |
| 5,318,086 A | 6/1994 | Narumi et al. |
| 5,337,814 A | 8/1994 | Bonko |
| 5,337,816 A | 8/1994 | Bonko et al. |
| 5,375,640 A | 12/1994 | Harms |
| 5,421,388 A | 6/1995 | Bonko et al. |
| 5,464,050 A | 11/1995 | Bonko |
| 5,494,966 A | 2/1996 | Hesp et al. |
| 5,866,171 A | 2/1999 | Kata |
| 5,875,527 A | 3/1999 | Lacey et al. |
| 5,901,765 A | 5/1999 | Bonko |
| 5,901,766 A | 5/1999 | Sandstrom et al. |
| 5,931,211 A | 8/1999 | Tamura |

(Continued)

FOREIGN PATENT DOCUMENTS

EP   0 943 656 A   9/1999

(Continued)

OTHER PUBLICATIONS

International Search Report dated Jul. 14, 2008 for International Appl. No. PCT/US2007/026386 filed Dec. 18, 2007.

(Continued)

*Primary Examiner* — Khanh P Nguyen
*Assistant Examiner* — Vishal I Patel
(74) *Attorney, Agent, or Firm* — Shaun J. Fox

(57) ABSTRACT

A tire includes bead insulation compound that is formed by combining a rubber component, a bituminous hydrocarbon resin, and a processing oil that includes naphthenic oil.

9 Claims, 5 Drawing Sheets

U.S. PATENT DOCUMENTS

| | | | |
|---|---|---|---|
| 5,971,046 A | 10/1999 | Koch et al. | |
| 6,046,260 A | 4/2000 | Hoover | |
| 6,060,542 A | 5/2000 | Gooswilligen et al. | |
| 6,105,646 A | 8/2000 | Siegenthaler | |
| 6,179,027 B1 | 1/2001 | Shimizu | |
| 6,260,594 B1 | 7/2001 | Bonko et al. | |
| 6,263,933 B1 | 7/2001 | Baus | |
| 6,291,588 B1 | 9/2001 | Nahmias et al. | |
| 6,293,323 B1 | 9/2001 | Binsfeld | |
| 6,298,890 B1 | 10/2001 | Binsfeld | |
| 6,302,175 B1 | 10/2001 | Shoyama | |
| 6,310,122 B1 | 10/2001 | Butler et al. | |
| 6,318,430 B1 | 11/2001 | Ueyoko et al. | |
| 6,352,090 B1 * | 3/2002 | Rayman | 152/167 |
| 6,401,774 B1 | 6/2002 | Rooney | |
| 6,447,905 B1 | 9/2002 | Hu et al. | |
| 6,450,221 B1 | 9/2002 | Bonko | |
| 6,458,884 B1 | 10/2002 | Colvin et al. | |
| 6,469,101 B2 | 10/2002 | Nahmias et al. | |
| 6,481,479 B1 | 11/2002 | Weed et al. | |
| 6,524,415 B1 | 2/2003 | Youngman et al. | |
| 6,713,540 B2 | 3/2004 | Rached et al. | |
| 6,799,617 B2 | 10/2004 | Matsumura | |
| 6,840,297 B2 | 1/2005 | Farinola | |
| 6,927,245 B2 | 8/2005 | Buras et al. | |
| 6,929,044 B1 | 8/2005 | Rooney | |
| 6,956,071 B2 | 10/2005 | Butler et al. | |
| 7,045,570 B2 | 5/2006 | Hart et al. | |
| 7,338,991 B2 | 3/2008 | Buras | |
| 7,365,111 B2 | 4/2008 | Buras et al. | |
| 2002/0187313 A1 * | 12/2002 | Hu et al. | 428/195 |
| 2005/0139302 A1 | 6/2005 | Reuter et al. | |
| 2006/0116449 A1 | 6/2006 | Buras et al. | |
| 2006/0116465 A1 | 6/2006 | Hiza et al. | |
| 2006/0225828 A1 | 10/2006 | Dyrlund et al. | |
| 2007/0044882 A1 | 3/2007 | Cowger et al. | |
| 2009/0062435 A1 | 3/2009 | Kanz et al. | |

FOREIGN PATENT DOCUMENTS

| | | |
|---|---|---|
| EP | 1 584 492 A | 10/2005 |
| JP | 07 026067 A | 1/1995 |
| JP | 10 230715 A | 9/1998 |
| JP | 2006 160856 A | 6/2006 |
| KR | 2002 0003414 A | 1/2002 |
| WO | WO 9414896 A1 * | 7/1994 |

OTHER PUBLICATIONS

International Report on Patentability dated Jun. 30, 2009 for International Application No. PCT/US2007/026386 filed internationally on Dec. 28, 2007.

* cited by examiner

TIRE BEAD INSULATION

This Application claims the benefit of U.S. Provisional Application No. 60/877,831, filed on Dec. 29, 2006, which is incorporated herein by reference.

FIELD OF THE INVENTION

One or more embodiments of this invention relate to tire bead insulation compound containing a bituminous hydrocarbon resin and a processing oil that includes naphthenic oil.

BACKGROUND OF THE INVENTION

A number of types of tires contain a bead portion that includes a rubbery bead insulation that surrounds and may be interspersed between bead wires or cords. Adhesion of the bead insulation to the bead wire or cord helps to provide tire durability.

Aromatic processing oil, which has been used to promote processability of rubber formulations, is being replaced in order to comply with European Union standards. The processing parameters and rubber formulations vary depending upon the portion of the tire and the type of tire desired. For example, the bead portion of a tire is formulated and processed differently than the tread of a tire. And, tires designed for off-road applications may require different processing parameters and/or rubber formulations than passenger car tires or tires for trucks or buses.

SUMMARY OF THE INVENTION

In general the present invention provides a tire comprising a tread portion; a pair of axially spaced bead portions; a pair of sidewall portions, each extending between the tread portion and one of the bead portions; a carcass extending between the bead portions, through the sidewall and tread portions; and a belt package disposed radially outside the carcass in the tread portion, where said bead portions each comprise a bead core and bead insulation compound, where the bead insulation compound is formed by combining a rubber component, bituminous hydrocarbon resin, and a processing oil, where the processing oil comprises naphthenic oil or a blend of oils including naphthenic oil, and where the processing oil comprises less than about 20 phr of highly aromatic oil, based upon the total weight of rubber in the bead insulation compound.

The present invention also includes a tire comprising a tread portion; a pair of axially spaced bead portions; a pair of sidewall portions extending between the tread portion and one of the bead portions, a carcass extending between the bead portions, through the sidewall and tread portions; and a belt package disposed radially outside the carcass in the tread portion, where said bead portion comprises a bead core and bead insulation compound, where the bead insulation compound is formed by combining a rubber component, bituminous hydrocarbon resin, and a processing oil, where said bead insulation compound comprises less than about 20 phr aromatic oil, based upon the total weight of rubber in the bead insulation compound, and where said bead insulation compound is characterized by a metal adhesion index of at least 101 when compared to a bead insulation compound containing greater than 20 phr aromatic processing oil and no bituminous hydrocarbon resin.

In one or more embodiments, the tire bead insulation compound of the present invention exhibits improved adhesion to the tire bead.

DETAILED DESCRIPTION OF ILLUSTRATIVE EMBODIMENTS

Figure 1:
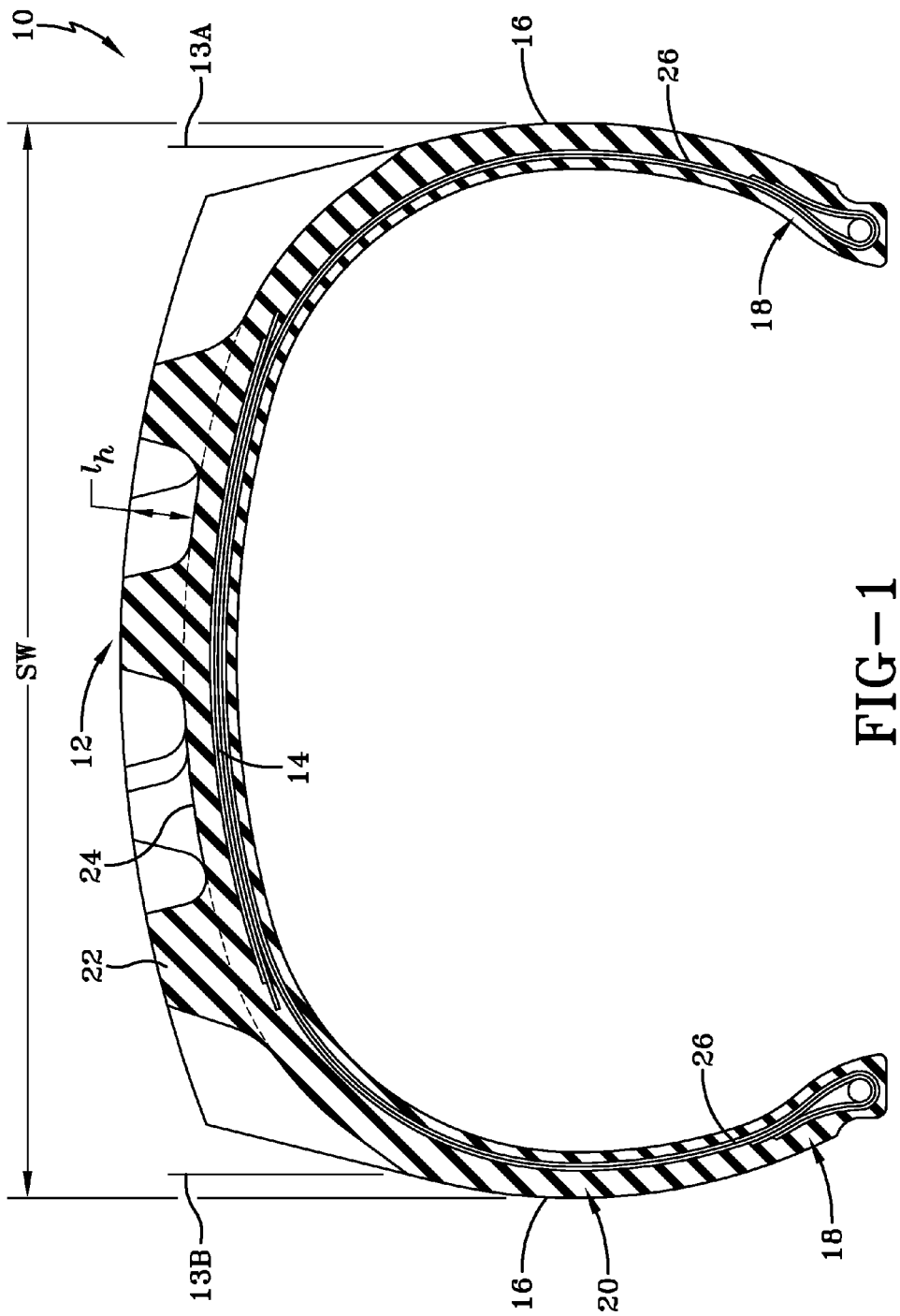
FIG. 1 is a cross-sectional view of an agricultural or industrial tire according to one or more embodiments of this invention.

One or more embodiments of the present invention provide a tire bead insulation compound. The terms "bead insulation compound" and "insulation compound," as they are used in this specification, refer to a mixture of materials. In one or more embodiments, the tire bead insulation compound includes a rubber component, a bituminous hydrocarbon resin, and a processing oil.

In one or more embodiments, bituminous refers to substances that contain or are derived from bitumen. In certain embodiments, bitumen includes semi-solid or solid hydrocarbon compounds occurring naturally or remaining as residue after distillation of petroleum.

Bituminous hydrocarbon resins may include resins containing asphalt, mineral rubber, or blended petroleum bitumens. In one or more embodiments, the bituminous hydrocarbon resin may include solid or slightly elastic bituminous material derived from Gilsonite and petroleum asphalts, and may be referred to as mineral rubber.

In one or more embodiments, the bituminous hydrocarbon resin has been modified by blowing air or steam through the molten hydrocarbon, and may be referred to as blown rubber, blown asphalt, or blown bitumen. Examples of bituminous hydrocarbons include a blended petroleum bitumen available from Flow Polymers, Inc. under the tradename Promix® 750.

In one or more embodiments, the bead insulation compound includes bituminous hydrocarbon resin in an amount of from about 2 to about 15 parts by weight (pbw) per one hundred parts by weight rubber (phr), based upon the total amount of rubber in the insulation compound. In another embodiment, the bead insulation compound includes from about 3 to about 12 pbw phr of bituminous hydrocarbon resin, and in another embodiment from about 4 to about 8 pbw phr of bituminous hydrocarbon resin based upon the total amount of rubber in the insulation compound.

As is known in the art, processing oil may be generally classified into three categories based upon the predominant type of carbon compounds in the oil. These categories include aromatic oil, naphthenic oil, and paraffinic oil. It will be understood that an oil may be classified as a naphthenic oil, yet may still contain some amount of aromatic or paraffinic carbon compounds. Likewise, an aromatic oil may contain some amount of naphthenic or paraffinic compounds.

In one or more embodiments, the processing oil employed in the present invention includes naphthenic oil. Naphthenic oils may be refined from crude oil, and contain fused rings of carbon atoms. Naphthenic oils are available for example as Shellflex 794, Ergon Black Oil C1, Ergon Black Oil C2, Ergon H2000, Cross C2000, Cross C2400, and San Joaquin 2000L. Naphthenic oils are also available from Cross Oil and Refining Company, Ergon Refining Inc., NYNAS, and Calumet Refining Company.

In one or more embodiments, the naphthenic oil includes at least about 30 percent by weight (wt. %) naphthenic components, in another embodiment, at least about 40 wt. % naphthenic components, and in yet another embodiment, at least about 45 wt. % naphthenic components, based upon the total weight of the naphthenic oil.

In one or more embodiments, the naphthenic oil may include some minor amount of aromatic carbon. In one embodiment, the naphthenic oil includes less than about 30 wt. % aromatic carbon content (% CA), based upon the total weight of carbon in the naphthenic oil. In another embodiment, the naphthenic oil includes less than about 20 wt. % aromatic carbon content, based upon the total weight of carbon in the naphthenic oil. In yet another embodiment, the naphthenic oil includes less than about 10 wt. % aromatic carbon content, based upon the total weight of carbon in the naphthenic oil.

In one or more embodiments, the processing oil includes a blend of one or more oils including naphthenic oil. In these embodiments, the processing oil blend contains less than about 30 wt. % of aromatic oil, in another embodiment, less than about 20 wt. % aromatic oil, and in yet another embodiment, less than about 10 wt. % aromatic oil, based upon the total amount of processing oil.

In one or more embodiments, the processing oil may be characterized as a blend of hydrocarbons having a carbon number of about 20 or greater, and a boiling point of about 335° C. or greater. In one or more embodiments, the processing oil has a Tg of from about −40° C. to about −80° C.

In one or more embodiments, the amount of processing oil in the bead insulation compound is from about 1 to about 30 pbw phr, in other embodiments, from about 5 to about 25 pbw phr, and in yet other embodiments, from about 10 to about 20 pbw phr.

In one or more embodiments, the amount of highly aromatic oil in the bead insulation compound is limited. Highly aromatic oil may be characterized by aromatic rings of carbon, and typically includes at least about 30 percent by weight aromatic components, i.e. CA is about 30 wt. % or greater, based upon the total weight of carbon in the oil. In one or more embodiments, the amount of highly aromatic oil in the bead insulation compound of the present invention is less than about 20 pbw phr. In another embodiment, the amount of highly aromatic oil in the bead insulation compound of the present invention is less than about 10 pbw phr. In yet another embodiment, the amount of highly aromatic oil in the bead insulation compound of the present invention is less than about 5 pbw phr.

In one or more embodiments, the processing oil contains less than about 3 percent by weight polycyclic aromatic compounds, based upon the total weight of processing oil.

The rubber component of the bead insulation compound, which may form a matrix or continuous phase in which the bituminous hydrocarbon resin and oil may be dispersed, may include vulcanizate compositions that are conventional in the art of fabricating bead insulation. In one or more embodiments, the vulcanizate is prepared from a vulcanizable composition that includes one or more polymers that are capable of being crosslinked or vulcanized; these polymers may be referred to as rubbery polymers. Useful rubbery polymers include natural rubber, synthetic polyisoprene, polybutadiene, polyisobutylene-co-isoprene, neoprene, poly(ethylene-co-propylene), poly(styrene-co-isoprene), poly(styrene-co-butadiene-co-isoprene), and poly(styrene-co-butadiene).

These rubbery polymers may be cured or crosslinked by employing a multitude of rubber curing agents including, but not limited to, sulfur or peroxide-based curing systems. Curing agents are described in *Kirk-Othmer, Encyclopedia of Chemical Technology,* 365-468, ($3^{rd}$ Ed. 1982), particularly *Vulcanization Agents and Auxiliary Materials,* 390-402, and A. Y. Coran, *Vulcanization in Encyclopedia of Polymer Science and Engineering,* ($2^{nd}$ Ed. 1989), which are incorporated herein by reference. Vulcanizing agents may be used alone or in combination. In one or more embodiments, the process of crosslinking or vulcanizing results in a three dimensional crosslinked infinite rubber network.

The bead insulation compound may further include optional components such as fillers. Fillers include inorganic and organic fillers. The organic fillers may include carbon black, ground coal, and starch. The inorganic fillers may include silica, aluminum hydroxide, magnesium hydroxide, clays (hydrated aluminum silicates), and mixtures thereof. The other or optional ingredients may be employed in conventional amounts as shown in U.S. Pat. Nos. 3,964,533, 4,561,919, 6,447,905, and U.S. Patent Application Publication No. 2006/0225828 A1, all of which are incorporated herein by reference.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

The bead insulation compositions of this invention can be prepared by employing conventional formulation techniques. In one or more embodiments, the rubber mixture may be prepared by forming an initial masterbatch that includes the rubbery polymers and filler. The initial masterbatch may include the bituminous hydrocarbon resin and the processing oil. In other embodiments, one or more of the bituminous hydrocarbon resin and the processing oil may be added in subsequent mixing stages. This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the bituminous hydrocarbon resin and the processing oil can be added during these remills. Rubber compounding techniques and the additives employed therein are generally known as disclosed in Stephens, The Compounding and Vulcanization of Rubber, in Rubber Technology (2nd Ed. 1973).

In one or more embodiments, the bead insulation compound may be employed in off-road tires, i.e. tires that have a primary use or working surface condition that is not on a paved road. Examples of off-road tires include those used on earthmovers, industrial and mining equipment, agricultural tires, lawn and garden tires, all terrain vehicles (ATVs) and dirt bikes or motocross motorcycles.

Many off-road vehicles require tires that have a larger radius than car or bus tires. In addition, tires for certain agricultural and industrial vehicles are designed to bear heavy loads. Tires for off-road vehicles are often adapted for use on loose ground. Good vibration characteristics on and off the road are desirable, as well as good traction and drawbar characteristics.

In one or more embodiments, the bead insulation compound of the present invention is employed in tires for vehicles used in industrial applications and to carry extreme loads while being used in off-road, rugged terrain.

Figure 2:
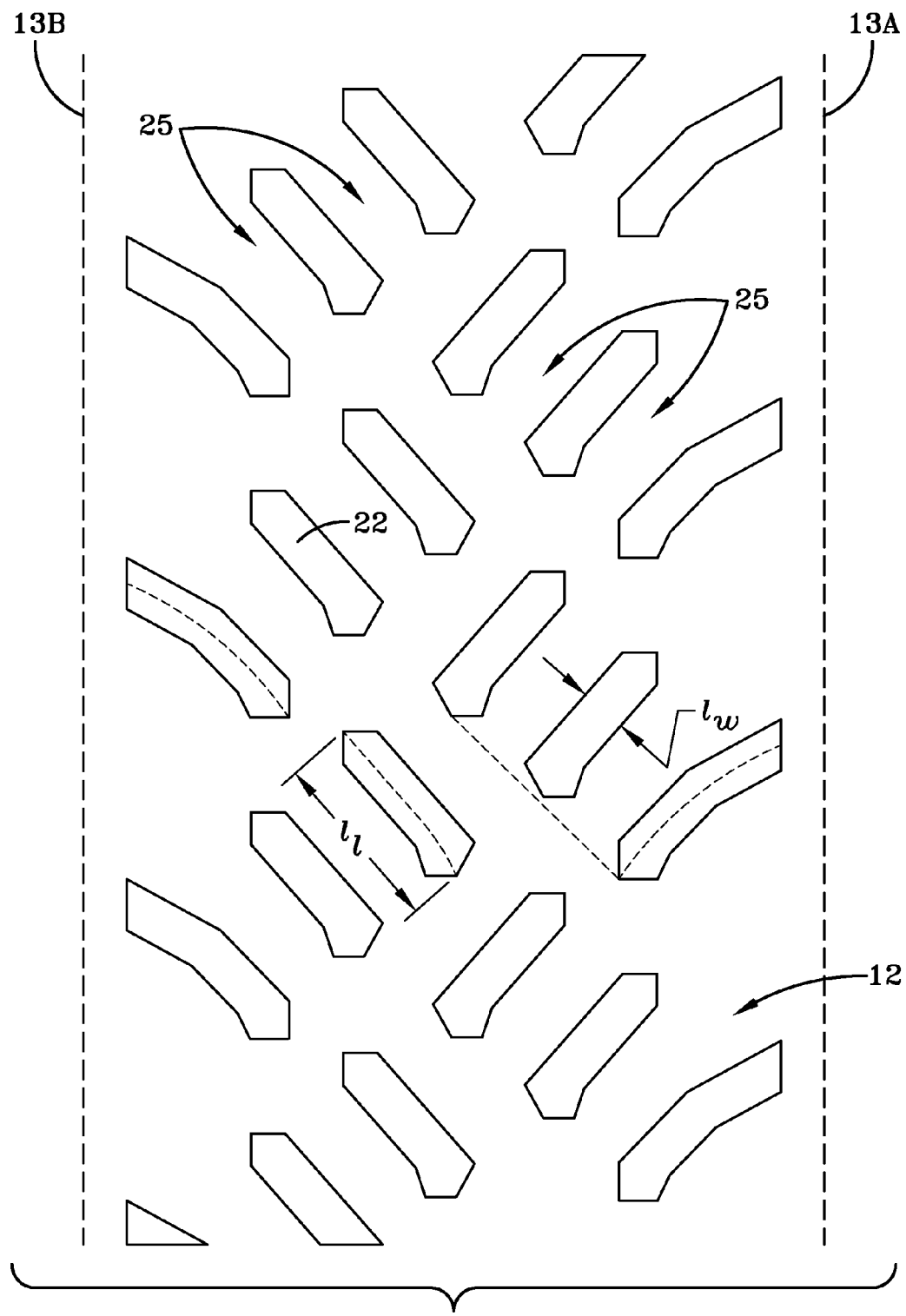
FIG. 2 is a plan view of a portion of the contact path of an agricultural or industrial tire according to one or more embodiments of this invention.

In one or more embodiments, the present invention provides a tire for industrial use or agricultural use. It will be understood that this encompasses a broad range of tire design. An example of a tire according to these embodiments is shown in FIGS. 1 and 2. Tire 10 includes a tread portion 12, a belt package 14, a pair of sidewalls 16, a pair of axially spaced bead portions 18, and a carcass 20 extending between the bead portions 18. Belt package 14 may be disposed radially outside the carcass 20 in tread portion 12. Belt package 14 may include high elastic modulus cords including steel, nylon, aromatic polyamide, rayon, and combinations thereof. Bead portion 18 is described hereinbelow.

In one or more embodiments, tread portion 12 includes a first and second tread edge 13A and 13B and a plurality of tread lugs 22 disposed between the tread edges and extending radially outward from inner tread 24. Tread portion 12 may further include channels (or grooves) 25 formed by the volumetric space above inner tread 24 between adjacent lugs 22. In other embodiments, tread design may vary.

Carcass 20 may include at least one body cord or ply 26 that extends between bead portions 18. In one or more embodiments, carcass 20 comprises at least one ply 26 of cords. In one embodiment, ply 26 includes a main portion and turnup portions, and extends between the bead portions 18 through tread portion 12 and sidewall portions 16, and is turned up around bead core 24 in each bead portion 18 from the inside to the outside of the tire to form a pair of carcass ply turnup portions.

Tire 10 may be further characterized by a diameter, either in terms of a rim diameter or a bead diameter, a section height, section width, and an aspect ratio. Section height (SH) represents the radial distance from the nominal rim diameter to the outer diameter of the tire. In one or more embodiments, the section height of tire 10 is at least about 40 cm, in other embodiments, at least about 50 cm, in yet other embodiments, at least about 70 cm, and in still yet other embodiments, at least about 100 cm. In one or more embodiments, the section height of tire 10 is from about 50 cm to about 130 cm, and in other embodiments, from about 70 cm to about 125 cm.

Section width represents the maximum linear distance parallel to the axis of the tire and between the exterior of its sidewalls when it is unloaded (i.e. not bearing a load) and after it has been inflated at normal pressure for 24 hours. The section width does not include elevations of the sidewalls due to labeling, decoration, or protective bands. In one or more embodiments, the section width is at least about 100 cm, in other embodiments, at least about 150 cm, in yet other embodiments, at least about 160 cm, and in still yet other embodiments, at least about 170 cm. In one or more embodiments, the section width is from about 100 cm to about 200 cm, in other embodiments, from about 150 cm to about 190 cm, and in yet other embodiments, from about 160 cm to about 180 cm.

The aspect ratio of the tire represents the ratio of the section height to the section width, multiplied by 100, and is generally expressed as a percentage. In one or more embodiments, the aspect ratio is from about 30 to about 75, and in other embodiments, from about 35 to about 70.

In one or more embodiments, tire 10 has a bead diameter of at least about 80 cm, in another embodiment, at least about 100 cm, and in yet another embodiment, at least about 140 cm. In one or more embodiments, tire 10 has a bead diameter of from about 80 cm to about 150 cm, and in other embodiments, from about 100 cm to about 145 cm.

In one embodiment, tire 10 has a section height of from about 50 cm to about 130 cm, a section width of from about 100 cm to about 200 cm, an aspect ratio of from about 30 to about 75, a bead diameter of at least about 80 cm, and a tread design of plain tread, super deep tread, super rock grip, or a combination thereof.

In one embodiment, tire 10 has a section height of from about 50 cm to about 130 cm, a section width of from about 100 cm to about 200 cm, an aspect ratio of from about 30 to about 75, a bead diameter of at least about 110 cm, and a tread design of plain tread, super deep tread, or a combination thereof.

In one embodiment, tire 10 has a section height of from about 50 cm to about 130 cm, a section width of from about 100 cm to about 200 cm, an aspect ratio of from about 30 to about 75, a bead diameter of at least about 140 cm, and a tread design of super rock grip deep tread.

In certain embodiments, a tire according to the present invention may be characterized as being puncture-proof, able to carry relatively heavy loads, and having good resistance to wear and tear. In one embodiment, the tire resists tearing and abrasion when used on broken and uneven surfaces, such as typically found in mills, mines, quarries and the like. In one or more embodiments, instances of premature failure of the tire, due to tears and separation of tire components, are reduced. In one or more embodiments, the tread is adapted to provide self-cleaning, or good soil discharge.

Industrial/agricultural tires are further described in U.S. Patent Publication No. 2005/0139302 A1, U.S. Pat. Nos. 3,844,326, 4,202,391, 4,611,647, 4,791,971, 4,649,976, 5,046,541, 5,063,573, 5,188,683, 5,337,814, 5,337,816, 5,421,388, 5,464,050, 5,901,765, 6,179,027, 6,260,594, 6,263,933, 6,450,221, and 6,481,479, each of which is hereby incorporated by reference.

In one or more embodiments, the bead insulation compound of the present invention is employed in tires for all terrain or rough terrain vehicles.

All terrain vehicles are relatively light weight with a relatively low center of gravity. Tires used on these vehicles are operated at very low pressures of 10 psi or less. The tires generally have nominal rim diameters of 36 cm or less and overall diameters of 66 cm or less. They are relatively wide, and have large air chambers to assist in absorbing shock and vibration. For certain off-road applications, the all terrain tires have a very open tread pattern with elongated lugs. This provides straightline or drawbar traction. Lateral traction is also desirable. Unlike farm tires that travel at speeds of less than 25 miles per hour, tires for all terrain vehicles must be capable of speeds of 50 mph or more.

Figure 3:
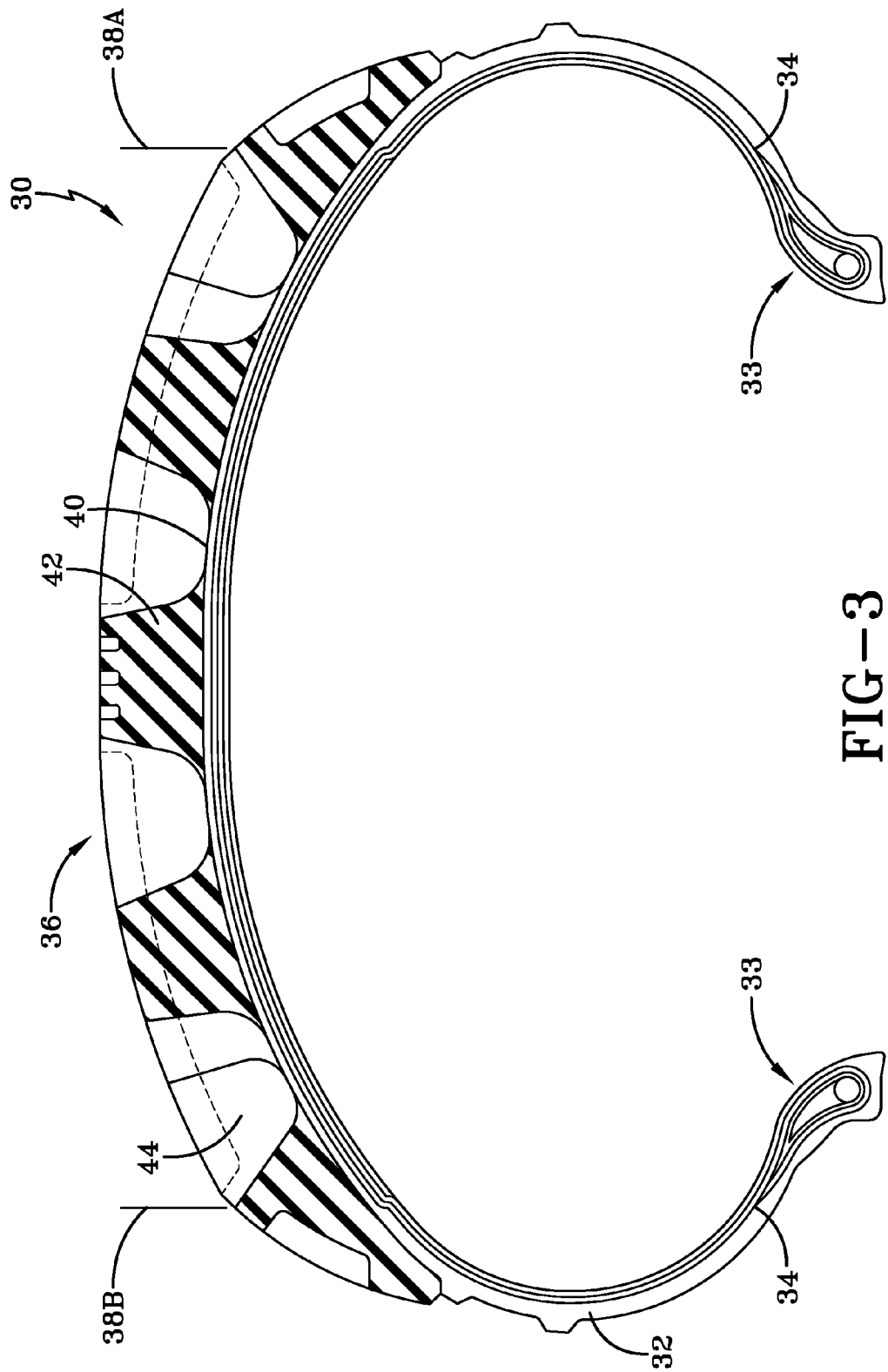
FIG. 3 is a cross-sectional view of an all terrain tire according to one or more embodiments of this invention.

In one or more embodiments, the present invention provides a tire for all terrain use. An example of a tire according to these embodiments is shown in FIG. 3. All terrain tire 30 includes a carcass 32 extending between a pair of annular bead portions 33, and one or more cord reinforced plies 34 wrapped about and extending between the bead portions. In certain embodiments, the all terrain tire has minimal belt reinforcements.

Tire 30 further includes a tread portion 36 disposed radially outward of carcass 32 and having tread edges 38A and 38B. Tread edges may be referred to as shoulders.

Tread portion 36 includes an inner tread 40, a plurality of lugs 42 extending radially outward from inner tread 40. Lugs located on the shoulder portion of the tread may be referred to as shoulder lugs. Tread portion 36 may further include blocks (not shown). Tread portion 36 may further include channels 44 formed by the volumetric space above inner tread 40 between adjacent lugs 42. At least a portion of channels 44 are adapted to function as soil discharge channels, extending from the center of tread portion 36 axially outward to a tread shoulder, and may be formed by the volumetric space above inner tread 40 between adjacent lugs and blocks. In one or more embodiments, tire 30 may further include puncture-preventing pads (not shown).

In one or more embodiments, tire 30 and more specifically tread portion 36 may be characterized by a net-to-gross ratio. The gross area is the entire footprint of tire 30, while the net area is the sum of those areas of tread 36 that are in contact with the ground. The ratio of the two depends upon the tread pattern of the footprint. In one or more embodiments, the tread, when normally loaded and inflated, has a net-to-gross ratio in one embodiment of from about 20% to about 40%, and in another embodiment, of from about 22% to about 33%.

In one or more embodiments, tire 30 has a nominal rim diameter of less than about 75 cm, and in another embodiment, less than about 70 cm. In certain embodiments, the rear tires may be slightly larger than the more lightly loaded front tires of the vehicle. Bead portion 33 is described hereinbelow.

In one or more embodiments, an all terrain or rough terrain tire according to the present invention provides good traction in sand, mud, or snow. In one embodiment, the tire provides low mud or soil accumulation and good cornering performance. In one or more embodiments, instances of premature failure of the tire, due to tears and separation of tire components, are reduced.

All terrain tires are further described in U.S. Pat. Nos. 4,881,586, 5,259,429, 5,318,086, 5,375,640, 6,293,323, 6,298,890, 6,401,774, 6,799,617, and 6,929,044, each of which is hereby incorporated by reference.

Figure 4:
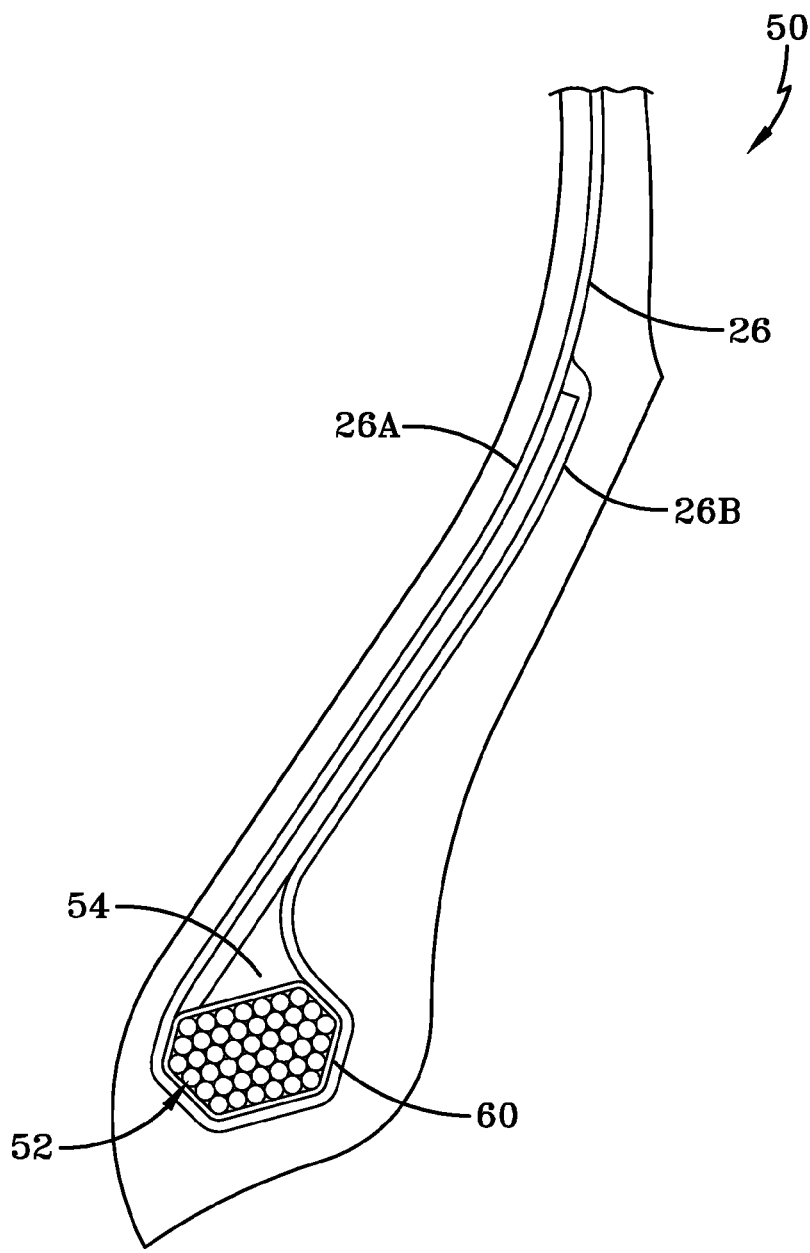
FIG. 4 is an enlarged cross sectional view of the bead portion thereof according to one or more embodiments of this invention.
Figure 5:
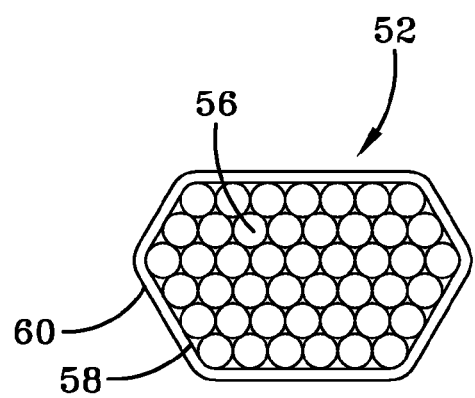
FIG. 5 is an exploded view of a portion of the tire bead as shown in FIG. 4.

Referring now to FIG. 4, a bead portion 50 of a tire is shown and generally denoted. It should be understood that bead portion 50 of the present invention may represent bead portions 18 of agricultural tires/industrial tires or bead portions 33 of all terrain tires. FIG. 5 is an exploded view of the bead core 52 that is shown in cross-section in FIG. 4.

Bead portion 50 includes bead core 52, bead filler 54, bead wires 56, and bead insulation 58. Bead filler 54, sometimes referred to as the bead apex, is surrounded by carcass ply 26 (which corresponds to ply 34 shown in FIG. 3), and bead core 52. In one embodiment, bead filler 54 includes a relatively hard rubber. The various compositions and methods of production for bead filler are further described in U.S. Pat. Nos. 4,087,298, 6,318,430, 6,524,415, and co-pending U.S. Pat. Publication No. 2007/0044882 A1, all of which are hereby incorporated by reference.

In one or more embodiments, bead core 52 includes at least one inextensible material. Examples of inextensible materials include coiled rubberized steel wire, coiled high-elastic-modulus organic cord such as aromatic polyamide fiber cord, wound tape-like material, and the like. In one embodiment, bead core 52 includes one or more wires 56 oriented in either parallel or crisscross mesh orientation, to reinforce the rubber product. Bead insulation 58 may surround and be interspersed between the wires or cords. In one or more embodiments, bead insulation 58 includes bead insulation compound as described hereinabove. In one or more embodiments, bead insulation compound adheres to bead wire 56, and this characteristic of the bead insulation compound may be referred to as bead wire adhesion.

In one or more embodiments, the bead insulation compound may be characterized by an improved bead wire adhesion, when compared to bead insulation compounds that do not include a rubber component, a bituminous hydrocarbon resin, and a naphthenic processing oil. In one or more embodiments, the improvement may be quantified as an index based upon comparison to a compound that does not include a rubber component, a bituminous hydrocarbon resin, and a naphthenic processing oil. In one or more embodiments, the bead wire adhesion may be measured by methods known in the art, such as ASTM D1871. In one embodiment, the bead wire adhesion index when compared to standard bead insulation compound tested under the same conditions is at least about 1.01, in other embodiments at least about 1.05, in yet other embodiments at least about 1.10, in still other embodiments at least about 1.15.

In one or more embodiments, the cross-sectional shape of bead 52 may be square, round, triangular, flat or any other shape. Any number of bead wires 56 and layers of wires may be used, depending upon the type of tire in which bead 52 is used. The size of the bead core may vary, for example depending upon the type of tire and the load.

The bead wire 56 may be of a number of different types. In certain embodiments, the wire or metal may be plated with a compatible metal such as bronze, brass, copper, or other metal. The wire or metal may be steel or other metals. In one embodiment, the bead wire includes a steel wire plated with copper, brass, or bronze. The wire may vary widely in diameter for example from about 0.001 up to about 1 inch or more in diameter, depending on the type of rubber product that is being reinforced. In one embodiment, the diameter of the wire is from about 0.005 up to about three-sixteenth inches. Various tire beads are further described in U.S. Pat. Nos. 6,105,646, 6,302,175, 6,447,905, and 6,840,297, all of which are hereby incorporated by reference.

In one or more embodiments, bead core 52 may be covered with a bead core cover 60. Cover 60 may include a textile fabric and/or a rubber layer to prevent direct contact of bead wire 56 with carcass ply 26. In one embodiment, cover 60 is made of organic fiber yarn such as nylon, rayon, polyester and the like. In certain embodiments, the yarn is relatively thin (for example, 940 dtex/2 to 1670 dtex/2) in comparison with the usual tire cords. In one or more embodiments, bead core 52 is only partially covered. In other embodiments, as shown in FIG. 3, cover 60 is wound around bead core 52 in at least a single layer, and in one embodiment, a double layer, so as to cover all the surface of bead core 52. In one or more embodiments, bead portion 50 may include two or more bead cores.

Figure 6:
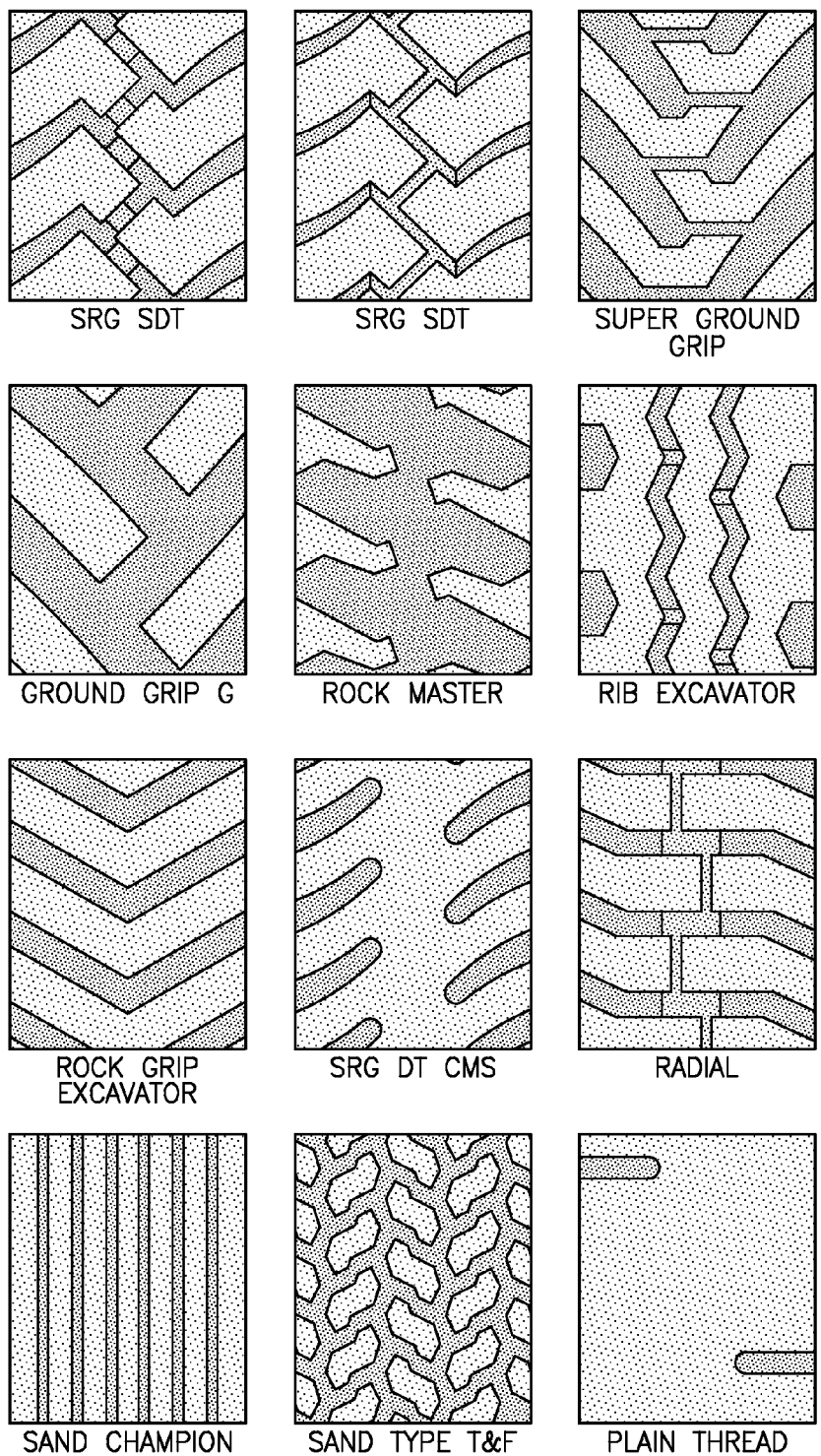
FIG. 6 is a schematic representation of various tread designs.

The tires of the present invention may include a wide variety of tread designs. Examples of tread design are represented in FIG. 6. PT is an abbreviation for plain tread. SDT is an abbreviation for super deep tread. SRG DT is an abbreviation for super rock grip deep tread.

The tires of the invention may be fabricated by employing conventional rubber shaping, molding, and curing techniques. In one or more embodiments, vulcanization can be effected by heating the vulcanizable composition within a mold. In one or more embodiments, the composition can be heated at an internal temperature from about 120° C. to about 180° C. It will be understood that industrial tires having thick, heavy tread may require longer cure times than smaller, passenger tires. In one or more embodiments, the tire composition is cured for at least about 1000 minutes. In another embodiment, the tire composition is cured for at least about 900 minutes. In yet another embodiment, the tire composition is cured for at least about 800 minutes. In other embodiments, the tire composition is cured for at least about 150 minutes, and in yet other embodiments, the tire composition is cured for at least about 50 minutes.

The cured or crosslinked rubber compositions (i.e., vulcanizates) generally include three-dimensional polymeric networks that are thermoset. Other ingredients, such as processing aids and fillers, as well as the fibers described in this invention, are generally dispersed throughout the vulcanized network. Tire preparation is discussed in U.S. Pat. Nos. 5,866,171, 5,875,527, 5,931,211, and 5,971,046, which are incorporated herein by reference.

In one or more embodiments of the present invention, tires prepared by using the bead insulation compounds described herein have good bead wire adhesion. In one or more embodiments, the bead insulation compounds have good processability. The amount of highly aromatic processing oil may be limited.

In order to demonstrate the practice of the present invention, the following examples have been prepared and tested. The examples should not, however, be viewed as limiting the scope of the invention. The claims will serve to define the invention.

EXAMPLES

Samples 1-5

Six rubber compositions were mixed, prepared into green rubber samples, cured into vulcanizates, and tested for various mechanical and dynamic properties. The recipe for the rubber formulation was typical for tire bead insulation. The rubber formulation was the same for each sample except as set forth in Table I, which provides the ingredients that were varied in parts by weight, based upon 100 parts rubber.

TABLE I

| Samples | 1 | 2 | 3 | 4 | 5 | 6 |
| --- | --- | --- | --- | --- | --- | --- |
| Aromatic Oil | 23.6 | — | — | — | — | — |
| Naphthenic Oil | — | 23.6 | — | — | — | — |
| Naphthenic Oil Blend | — | — | 23.6 | 19.6 | 14.6 | 8.6 |
| Bituminous Hydrocarbon Resin | — | — | — | 4 | 8 | 12 |

Each rubber composition was prepared in three mixing segments. A 3300 g Kobelco mixer was used for the mixing. The first mix, which may be referred to as the masterbatch, employed a mixer speed of 60 r.p.m. with an initial temperature of 130° C. A maximum mixing time of 6 minutes was used, and a drop temperature of about 170° C. Immediately following the masterbatch, the mixture was transferred to a two-roll mill operating at a temperature of about 60° C., where the composition was sheeted and subsequently cooled to room temperature. The masterbatch stock was then further mixed in a remill stage using similar conditions to those employed in the masterbatch. Immediately following the remill, the mixture was transferred to a two-roll mill operating at 60° C., where the composition was sheeted and subsequently cooled to room temperature. The composition was then transferred back to the Kobelco mixer and the final-batch ingredients (e.g., curatives) were added. The initial mixer temperature was 70° C., and the mixing speed was about 40 r.p.m. The composition was removed from the mixer after a maximum mixing time of about 3 minutes, and a drop temperature of about 100° C. This composition was then milled and sheeted using a two-roll mill at 60° C. The composition was fabricated into green test samples including cylindrical buttons (0.79 cm×1.5 cm), sheets (15.24 cm×15.24 cm×0.19 cm or 15.24 cm×15.24 cm×0.52 cm), and donut-shaped Lambourn wear specimens (outer=4.85 cm, inner=2.25 cm, thickness=0.49 cm). One set of green samples was then cured at about 150° C. for 60 minutes in standard molds placed in a hot press. Another set of samples was cured at about 150° C. for about 900 minutes.

Table II sets forth the data obtained from various mechanical and dynamic tests performed on the various samples.

TABLE II

| Sample | 1 | 2 | 3 | 4 | 5 | 6 |
| --- | --- | --- | --- | --- | --- | --- |
| Scorch | 100 | 95 | 102 | 111 | 100 | 88 |
| Mooney viscosity | 100 | 99 | 101 | 108 | 117 | 130 |
| MH | 100 | 99 | 98 | 101 | 102 | 107 |
| $T_{50}$ | 100 | 109 | 110 | 115 | 107 | 96 |
| Stress strain 60 min @ 148.9° C. | | | | | | |
| 50% Modulus @ 23° C. (MPa) | 100 | 91 | 87 | 86 | 93 | 105 |
| 100% Modulus @ 23° C. (MPa): | 100 | 91 | 87 | 82 | 88 | 97 |
| Elongation at break @ 23° C. (%): | 100 | 110 | 111 | 122 | 126 | 123 |
| Tensile at Break @ 23° C. (MPa): | 100 | 101 | 97 | 93 | 95 | 95 |
| Stress strain 900 min @ 150° C. | | | | | | |
| 50% Modulus @ 23° C. (MPa) | 100 | 98 | 94 | 92 | 97 | 104 |
| 100% Modulus @ 23° C. (MPa): | 100 | 101 | 94 | 90 | 93 | 97 |
| Elongation at break @ 23° C. (%): | 100 | 93 | 96 | 113 | 124 | 125 |
| Tensile at Break @ 23° C. (MPa): | 100 | 96 | 90 | 92 | 94 | 94 |
| Durometer | 100 | 100 | 96 | 101 | 102 | 106 |
| Rebound | 100 | 112 | 105 | 99 | 90 | 86 |

Tensile mechanical properties were measured using ASTM-D 412 at 23° C. The green stock Mooney viscosity measurements were taken at 130° C. The sample was preheated for 1 minute, a large rotor was started, and the torque was measured after 4 minutes of rotation. Mooney scorch measurements, specifically the time required for an increase of 5 Mooney units (T5) can indicate how fast the compound viscosity will increase during extrusion processes. Curing characteristics were measured using a Monsanto Rheometer MD2000, at a frequency of 1.67 Hz, 160° C., and a strain of 7%. MH is the measured maximum torque. T50 is the time required for the torque to reach 50% of the total torque increase during the curing process.

The Zwick Rebound Test is a dynamic test that measures rebound resilience. Rebound resilience is typically defined as the ratio of mechanical energies before and after impact. Samples were tested according to ASTM D1054-91(2000). Sample specimens were milled and cured according to ASTM D1054, using the mold specified. The cured sample was coated with talc and conditioned in an oven for about one hour at the recommended temperature. The conditioned sample was placed into a Zwick type rebound tester, a pendulum was swung against the sample, and the angle at which the pendulum bounced back was measured. Percent rebound is calculated according to the equation specified in ASTM D1054. Bead wire adhesion was tested according to ASTM D1871. An index was calculated based upon Sample 1. Results for the steel cord bead wire adhesion test are shown in Table III. For example, Sample 3 has a metal adhesion index of 97 when compared to Sample 1.

TABLE III

| Sample | 1 | 2 | 3 | 4 | 5 | 6 |
|---|---|---|---|---|---|---|
| 35' @ 160° C., 23° C. | 100 | 101 | 97 | 105 | 102 | 109 |
| 900' @ 150° C., 23° C. | 100 | 91 | 97 | 117 | 111 | 121 |

Various modifications and alterations that do not depart from the scope and spirit of this invention will become apparent to those skilled in the art. This invention is not to be duly limited to the illustrative embodiments set forth herein.

What is claimed is:

1. A tire comprising:
    a tread portion;
    a pair of axially spaced bead portions;
    a pair of sidewall portions, each extending between the tread portion and one of the bead portions;
    a carcass extending between the bead portions, through the sidewall and tread portions; and
    a belt package disposed radially outside the carcass in the tread portion, where said bead portions each comprise a bead core and bead insulation compound, where the bead insulation compound is formed by combining a rubber component, from about 2 to about 12 phr of bituminous hydrocarbon resin based upon the total weight of rubber in the bead insulation compound, and a processing oil, where the processing oil comprises naphthenic oil or a blend of oils including naphthenic oil, and where the processing oil comprises less than about 20 phr of highly aromatic oil, based upon the total weight of rubber in the bead insulation compound.

2. The tire of claim 1, where the bituminous resin comprises asphalt, mineral rubber, or blended petroleum bitumens.

3. The tire of claim 1, where the bituminous resin comprises blown asphalt.

4. The tire of claim 1, where the bead insulation compound comprises from about 1 to about 30 phr of a processing oil.

5. The tire of claim 1, where the rubber component comprises natural rubber, synthetic polyisoprene, polybutadiene, polyisobutylene-co-isoprene, neoprene, poly(ethylene-co-propylene), or poly(styrene-co-butadiene).

6. The tire of claim 1, where the bead portion comprises two or more bead cores.

7. The tire of claim 1, where the tire has a bead diameter of at least about 80 cm.

8. The tire of claim 1, where the tire has a section height of at least about 40 cm.

9. The tire of claim 1, where the tire has a section width of at least about 100 cm.

* * * * *